United States Patent
Matsumoto et al.

(10) Patent No.: US 10,422,871 B2
(45) Date of Patent: Sep. 24, 2019

(54) OBJECT RECOGNITION APPARATUS USING A PLURALITY OF OBJECT DETECTING MEANS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Yusuke Matsumoto, Kariya (JP); Ryo Takaki, Kariya (JP); Akira Isogai, Kariya (JP); Ichiro Aizawa, Toyota (JP); Jun Tsuchida, Okazaki (JP); Koichi Sato, Anjo (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 300 days.

(21) Appl. No.: 15/501,786

(22) PCT Filed: Aug. 4, 2015

(86) PCT No.: PCT/JP2015/072111
§ 371 (c)(1),
(2) Date: Feb. 3, 2017

(87) PCT Pub. No.: WO2016/021606
PCT Pub. Date: Feb. 11, 2016

(65) Prior Publication Data
US 2017/0227634 A1   Aug. 10, 2017

(30) Foreign Application Priority Data
Aug. 6, 2014   (JP) .................. 2014-160680

(51) Int. Cl.
*G01S 13/86* (2006.01)
*G01S 7/497* (2006.01)
(Continued)

(52) U.S. Cl.
CPC .......... *G01S 13/867* (2013.01); *G01S 7/4026* (2013.01); *G01S 7/417* (2013.01); *G01S 7/497* (2013.01);
(Continued)

(58) Field of Classification Search
CPC .... G01S 13/867; G01S 13/931; G01S 17/023; G01S 17/42; G01S 17/58; G01S 17/93;
(Continued)

(56) References Cited

U.S. PATENT DOCUMENTS

| | | | |
|---|---|---|---|
| 6,246,949 B1* | 6/2001 | Shirai ................ | B60K 31/0008 342/70 |
| 2004/0183663 A1* | 9/2004 | Shimakage .......... | B62D 15/029 340/436 |

(Continued)

FOREIGN PATENT DOCUMENTS

| JP | 2004-198159 A | 7/2004 |
|---|---|---|
| JP | 2004-205398 A | 7/2004 |

(Continued)

*Primary Examiner* — Timothy X Pham
(74) *Attorney, Agent, or Firm* — Knobbe, Martens, Olson & Bear, LLP

(57) ABSTRACT

A vehicle as a moving body is provided with an imaging device as first object detecting means and a radar apparatus as second object detecting means. The object recognition apparatus is provided with axis displacement learning means for learning an axis displacement of the reference axis X1 of the first object detecting means; axis displacement determining means for performing, based on an object detecting result of the first object detecting means and the second object detecting means, an axis displacement determination
(Continued)

process for determining whether or not an axis displacement has occurred in the reference axis of the second object detecting means; and disabling means for disabling, based on a learning result of the axis displacement by the axis displacement learning means, information about an axis displacement of the second object detecting means acquired by the axis displacement determination process.

8 Claims, 7 Drawing Sheets

(51) Int. Cl.

| | | |
|---|---|---|
| G01S 17/02 | (2006.01) | |
| G01S 17/42 | (2006.01) | |
| G01S 17/58 | (2006.01) | |
| G01S 17/93 | (2006.01) | |
| G01S 7/40 | (2006.01) | |
| G01S 13/93 | (2006.01) | |
| G06T 7/246 | (2017.01) | |
| G01S 7/41 | (2006.01) | |
| G06K 9/00 | (2006.01) | |
| G06K 9/03 | (2006.01) | |
| G06K 9/20 | (2006.01) | |
| G06K 9/62 | (2006.01) | |
| G06K 9/78 | (2006.01) | |
| G08G 1/16 | (2006.01) | |
| G06T 7/13 | (2017.01) | |

(52) U.S. Cl.
CPC .......... *G01S 13/931* (2013.01); *G01S 17/023* (2013.01); *G01S 17/42* (2013.01); *G01S 17/58* (2013.01); *G01S 17/93* (2013.01); *G01S 17/936* (2013.01); *G06K 9/00798* (2013.01); *G06K 9/03* (2013.01); *G06K 9/209* (2013.01); *G06K 9/6256* (2013.01); *G06K 9/78* (2013.01); *G06T 7/246* (2017.01); *G06T 7/13* (2017.01); *G06T 2207/30242* (2013.01); *G06T 2207/30256* (2013.01); *G08G 1/166* (2013.01)

(58) Field of Classification Search
CPC ...... G01S 17/936; G01S 7/4026; G01S 7/417; G01S 7/497; G06K 9/00798; G06K 9/03; G06K 9/209; G06K 9/6256; G06K 9/78; G06T 2207/30242; G06T 2207/30256; G06T 7/13; G06T 7/246; G08G 1/166
USPC .......................................................... 342/52
See application file for complete search history.

(56) References Cited

U.S. PATENT DOCUMENTS

| | | | | |
|---|---|---|---|---|
| 2005/0219530 | A1* | 10/2005 | Horibe | G01S 7/4972 |
| | | | | 356/399 |
| 2008/0036576 | A1* | 2/2008 | Stein | B60R 1/00 |
| | | | | 340/425.5 |
| 2014/0340518 | A1* | 11/2014 | Kambe | G06K 9/00791 |
| | | | | 348/148 |
| 2016/0027176 | A1* | 1/2016 | Zeng | G06T 7/80 |
| | | | | 348/148 |
| 2016/0314365 | A1* | 10/2016 | Poledna | G06K 9/00805 |
| 2016/0349356 | A1 | 12/2016 | Takaki | |

FOREIGN PATENT DOCUMENTS

| | | |
|---|---|---|
| JP | 2008-215912 | 9/2008 |
| JP | 2010-249613 A | 11/2010 |
| JP | 2010-281584 A | 12/2010 |
| JP | 2011-002346 A | 1/2011 |

* cited by examiner

OBJECT RECOGNITION APPARATUS USING A PLURALITY OF OBJECT DETECTING MEANS

CROSS-REFERENCE TO RELATED APPLICATION

This application is based on and claims the benefit of priority from earlier Japanese Patent Application No. 2014-160680 filed Aug. 6, 2014, the description of which is incorporated herein by reference.

BACKGROUND OF THE INVENTION

Technical Field

The present disclosure relates to an object recognition apparatus, particularly to an object recognition apparatus mounted on a moving body.

Background

A technique for enhancing a travelling safety has been known. For example, an object recognition apparatus is provided with object detecting sensors including a millimeter radar apparatus and a laser radar apparatus and detects objects existing around the vehicle, such as preceding vehicles, pedestrians, and obstacles. The object recognition apparatus performs various controls in accordance with the detection result of objects, so as to enhance the travelling safety of the vehicle.

According to such an object recognition apparatus, in the case where the reference axis is displaced (optical axis displacement) in an object detection sensor mounted on the vehicle, an object detection area of the object detection sensor is shifted from an ideal area to be detected so that the detection accuracy may be lowered. In this case, the accuracy of various controls to enhance the travelling safety of the vehicle may be decreased.

In this respect, techniques have been proposed for detecting an axis displacement of an object detecting sensor. For example, according to JP-A-2004-205398, with a vehicle provided with a camera and a radar apparatus, a technique is disclosed where an error is detected between a transmission direction of laser beam and a straight-forward running direction of the vehicle, thereby adjusting the transmission direction of the laser beam. The error is detected in accordance with vanishing points and transmission direction of the laser beam, the vanishing points and the transmission direction being detected based on images acquired by the camera while the vehicle is running.

CITATION LIST

Patent Literature

[PTL 1] JP-A-2004-205398

Considering the case where an axis displacement is detected using images captured by an imaging device, the displacement of the axis in the radar apparatus may not be accurately detected, when the displacement of the reference axis (imaging axis) of the imaging device has actually occurred. Hence, erroneous determination may be caused.

SUMMARY

Hence it is desired to provide an object recognition apparatus capable of minimizing erroneous determination in the process of determining whether or not the reference axis of the object detecting means mounted on a moving body.

The present disclosure is configured in the following manner.

The present disclosure relates to an object recognition apparatus applied to a moving body provided with a first object detecting means and a second object detecting means as an object detecting means that detects an object existing predetermined detection available areas. According to the object recognition apparatus recited in claim 1, the detection available areas each include a reference axis, and this apparatus is characterized in that the apparatus includes axis displacement learning means for learning an axis displacement of the reference axis of the first object detecting means; axis displacement determining means for performing, based on an object detecting result of the first object detecting means and the second object detecting means, an axis displacement determination process for determining whether or not an axis displacement has occurred in the reference axis of the second object detecting means; and disabling means for disabling, based on a learning result of the axis displacement by the axis displacement learning means, information about an axis displacement of the second object detecting means acquired by the axis displacement determination process.

In the case where the apparatus determines whether or not a displacement of the reference axis has occurred in the second object detecting means, using the object detection result of the first object detecting means, a detection accuracy of the axis displacement determination of the second object detecting means may be changed depending on a learning result of the axis displacement of the first object detecting means. For example, when the learning result of the axis displacement of the first object detecting means does not have such high learning accuracy, the axis displacement determining of the second object detecting means may cause erroneous determination. In this regard, according to the above-described configuration, information about axis displacement of the reference axis of the first object detecting means is disabled, based on a learning result of the axis displacement of the first object detecting means. According to the configuration, in the process of determining whether or not a displacement of the reference axis has occurred in the second object detecting means, erroneous determination can be suppressed.

DETAILED DESCRIPTION OF THE PREFERRED EMBODIMENTS

Hereinafter, with reference to the drawings, embodiments will be described in which an object recognition apparatus of the moving body is embodied. An object recognition apparatus 10 according to the present embodiment is mounted on a vehicle as a mobile apparatus. An imaging device 11 and a radar apparatus 12 recognize objects existing in a detection available area including ahead of the vehicle.

Figure 1:
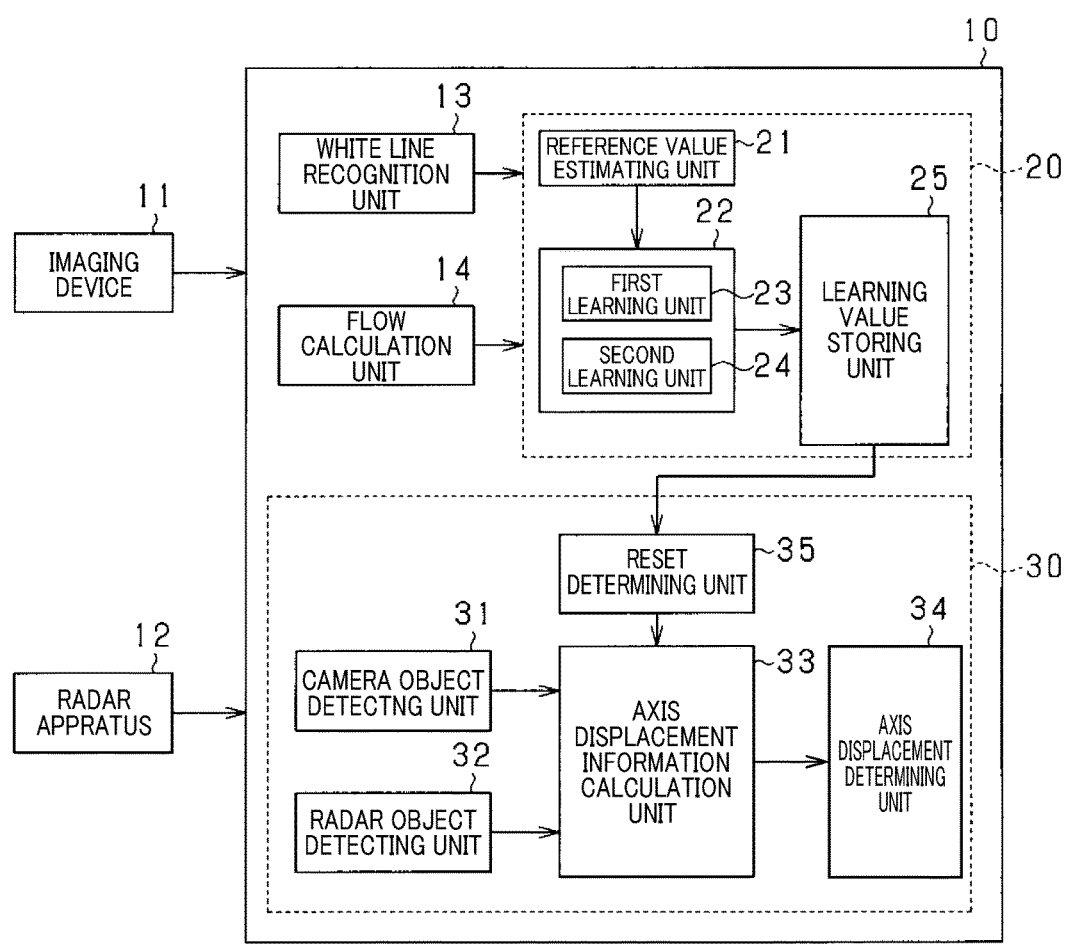
FIG. 1 is a block diagram showing an overall configuration of an object recognition apparatus.
Figure 2:
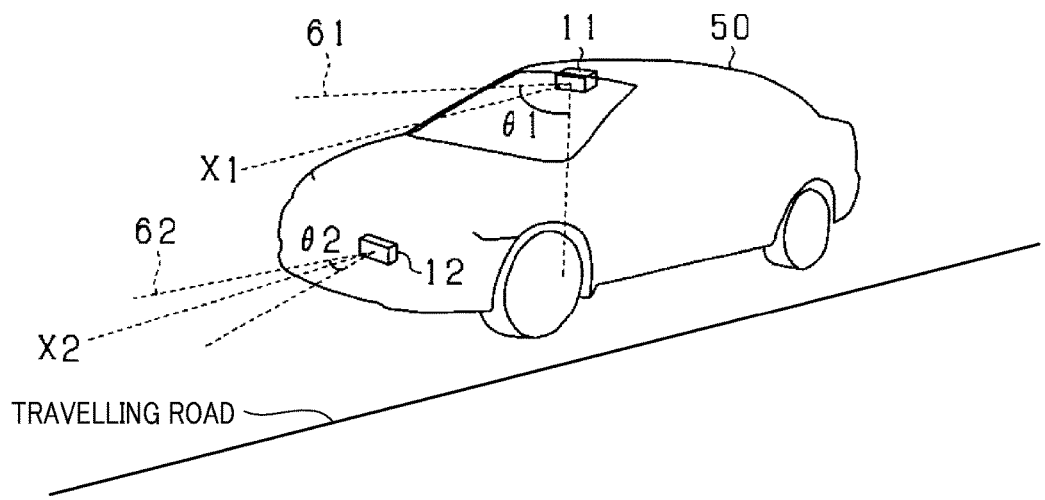
FIG. 2 is a diagram showing an arrangement of an imaging device and a radar apparatus in a moving body.

The imaging device 11 is an on-vehicle camera is configured of a CCD camera, a CMOS image sensor, a near-infrared camera or the like. The imaging device 11 captures peripheral environment of an own vehicle 50 including a traveling road of the own vehicle, generates image data showing the captured images, and successively outputs the image data to the object recognition apparatus 10. The imaging device 11 according to the present embodiments is disposed, for example, in the vicinity of the upper end of the front windshield, capturing an area 61 spreading ahead of the own vehicle in a range defined by a predetermined angle θ1 with respect to the imaging axis X1 as the center of the range (See FIG. 2). It should be noted that the imaging device 11 may be a monocular camera or a stereo camera.

The radar apparatus 12 transmits electromagnetic waves as transmission waves (radar waves) and receives the reflected waves to detect objects. For example, the radar apparatus 12 is configured of a millimeter wave radar device or a laser radar device or the like. The radar apparatus 12 is mounted on the front part of the own vehicle 50, and scans an area 62 spreading ahead of the own vehicle in a range defined by a predetermined angle θ2 (θ2<θ1) with respect to the light axis X2 as the center of the range. Then, the radar apparatus 12 generates ranging data based on a period from a time when the electromagnetic waves are transmitted ahead of the vehicle to a time when the reflected waves are received, and successively outputs the ranging data to the object recognition apparatus 10. The ranging data includes information of an azimuth where the object exists, a relative speed up to the object.

The imaging device 11 and the radar apparatus 12 are mounted to the own vehicle 50 such that the imaging axis X1 as the reference axis of the imaging device 11 and the light axis X2 as the reference axis of the radar apparatus 12 are a direction parallel to the road surface where the own vehicle runs (traveling road surface). The detection available area 61 of the imaging device 11 and the detection available area 62 of the radar apparatus 12 are mutually overlapped at least in a part of the area. The imaging device 11 corresponds to first object detecting means and the radar apparatus 12 corresponds to second object detecting means.

The object recognition apparatus 10 is a computer provided with CPU, RAM, ROM, I/O and the like. The object recognition apparatus 10 is provided with a white line recognition unit 13, a flow calculation unit 14, a vanishing point calculation unit 20 and a radar axis displacement detecting unit 30, in which these functions are achieved by the CPU executing a program stored in the ROM.

The white line recognition unit 13 accepts an image captured by the imaging device 11 and recognizes a white line included in the image to be a road marking. For example, the white line recognition unit 13 extracts, from the captured image data, based on a brightness change ratio in a horizontal direction of the image, an edge point to be a candidate of the white line, and stores extracted edge points for every 1 frame. Then, the white line recognition unit 13 recognizes white line based on the history of the edge points of the stored white line. The flow calculation unit 14 accepts the images captured by the imaging device 11, and calculates an optical flow with movement vectors corresponding to respective points in the images (flow calculating means). For example, the flow calculation unit 14 calculates, based on a change in a spatial brightness distribution, the movement vectors.

The vanishing point calculation unit 20 is provided with a reference value estimating unit 21, a vanishing point learning unit 22 and a learning value storing unit 25. The reference value estimating unit 21 accepts information (white line information) about the location of the white line or the like from the white line recognition unit 13, and accepts information (flow information) about the optical flow from the flow calculation unit 14, and executes various processes to obtain vanishing points (focus of expansion: FOE) by using these input data.

The reference value estimating unit 21 calculates vanishing points based on the image data captured by the imaging device 11. Specifically, the reference estimating unit 21 calculates vanishing points by using the white line information transmitted from the white line recognition unit 13 and the flow information transmitted from flow calculation unit 14. For example, in the case where the white line information is used, the reference value estimating unit 21 estimates cross points of a pair of white lines existing around the vehicle to be the vanishing point, and stores the value (reference vanishing point) into the ROM. In the time of shipping the vehicle, an initial value is stored in the ROM as the vanishing point. The initial value is set in accordance with a parameter representing a mounting state of the imaging device 11 (e.g., height of mounting, depression angle of the imaging axis) and a parameter concerning an imaging function of the imaging device 11 (e.g., the number of pixels, focal distance).

The vanishing point learning unit 22 executes the vanishing point learning for calculating a stationary displacement (axis displacement of imaging axis X1) of the vanishing point caused by a change in the height of mounting or the axis direction of the imaging device 11. Specifically, the vanishing point learning unit 22 includes a first learning unit 23 and a second learning unit 24. The first learning unit 23 executes a learning process of the vanishing point calculated from the white line information, and the second learning unit 24 executes a learning process of the vanishing point calculated from the flow information. Each learning value (vanishing point learning value) of the first learning unit 23 and the second learning unit 24 is stored and updated in the learning value storing unit 25 every time when the learning process is executed.

The vanishing point learning unit 22 starts vanishing point learning when the start switch (e.g., ignition switch) of the own vehicle 50 is turned ON. According to the present embodiment, considering that the height of mounting or the axis direction of the imaging device change depending on a loading state and a running state of the vehicle, the vanishing point learning is successively executed, even when the vanishing point learning is once completed after the start switch is turned ON.

The learning value storing unit 25 is configured of, for example, electrically rewriteable non-volatile memory (e.g., EEPROM). The object recognition apparatus 10 analyzes image data using the vanishing point as an index, whereby the value storing unit 25 estimates a running state of the own vehicle 50 on the traveling road or a positional relationship to the preceding vehicle, or recognizes pedestrians.

The white line recognition based on the images takes more time compared to the calculation of the optical flow. Hence, after turning ON of the start switch of the own vehicle 50, the vanishing point learning of the optical flow completes earlier than the completion of the vanishing point learning of the white line recognition. On the other hand, the accuracy of the vanishing learning using the white line recognition is higher than that of the optical flow. According to the present embodiment, after turning ON of the start switch of the own vehicle 50 and until the vanishing point learning of the white line recognition, image data is analyzed using a learning value calculated by the optical flow, and after completion of the vanishing learning of the white line recognition, the image data is analyzed using a learning value calculated by the white line recognition.

The radar axis displacement detecting unit 30 is provided with a camera object detecting unit 31, a radar object detecting unit 32, an axis displacement information calculation unit 33, an axis displacement determining unit 34 and a reset determining unit 35.

The camera object detecting unit 31 accepts image captured by the imaging device 11 and detects an object (camera object) included in the image. The radar object detecting unit 32 accepts ranging data from the radar apparatus 12, and detects an object (radar object) included in the ranging data. The axis displacement information calculation unit 33 determines, based on a detection result of the camera object detecting unit 31 and a detection result of the radar object detecting unit 32, whether or not a light axis displacement has occurred in the radar apparatus 12.

Specifically, the axis displacement information calculation unit 33 accepts information about the camera object detected by the camera object detecting unit 31 and information about the radar object detected by the radar object detecting unit 32. The axis displacement information calculation unit 33 calculates a camera object detecting counter CA and an axis displacement determining counter CJ. In more detail, the camera object detecting counter CA is incremented at a predetermined period, in the case where an object (e.g., preceding vehicle) exists ahead of the own vehicle 50, and at least the camera object detecting unit 31 has detected a target object corresponding to the object. Moreover, in the case where the radar object detecting unit 32 has detected a target object which can be the same object as the target object detected by the camera object detecting unit 31, the axis displacement determining counter CJ is incremented. The camera object detecting counter CA and the axis displacement determining counter CJ correspond to information about light axis displacement.

The axis displacement determining unit 34 determines, based on the camera object detecting counter CA and the axis displacement determining counter CJ transmitted by the axis displacement information calculation unit 33, whether or not a light axis displacement of the radar apparatus 12 has occurred. Specifically, the ratio of the axis displacement determining counter CJ to the camera object detecting counter CA is calculated, and compares the ratio between CJ and CA with the determination value THA2, thereby determining whether or not light axis displacement of the radar apparatus 12 has occurred. The light axis displacement is determined to have occurred when a condition of CJ/CA<THA2 is met. The reset determining unit 35 determines whether the camera object detecting counter CA and the axis displacement determining counter CJ are outputted to the axis displacement determining unit 34 or disables the counters CA and CB as invalid data.

Hereinafter, a reset determination process executed by the reset determining unit 35 will be described in detail. The reset determination process will be performed for the camera object detecting counter CA and the axis displacement determining counter CJ will be described. The reset determination unit 35 accepts the vanishing point learning value from the learning value storing unit 25, and determines, based on the vanishing point learning value accepted by the reset determination unit 35, whether or not a reset is required for the camera object detecting counter CA and the axis displacement determining counter CJ.

Specifically, the reset determination unit 35 sets, based on the vanishing point learning value stored in the learning value storing unit 25, a past FOE credit flag Ftr to be 0 or 1, and outputs the flag Ftr being set to the axis displacement information calculation unit 33. The past FOE credit flag Ftr is information representing whether or not a reset is required for the he camera object detecting counter CA and the axis displacement determining counter CJ. The axis displacement information calculation unit 33 holds measurement values of the camera object detecting counter CA and the axis displacement determining counter CJ, when the past FOE credit flag Ftr accepted by the axis displacement information calculation unit 33 is 1. On the other hand, when the past FOE credit flag is 0, the axis displacement information calculation unit 33 resets the camera object detecting counter CA and the axis displacement determining counter CJ to be 0, and resumes the measurement of the counters. It should be noted that the axis displacement information calculation unit 33 and the reset determination unit 35 configure disabling means.

Figure 3:
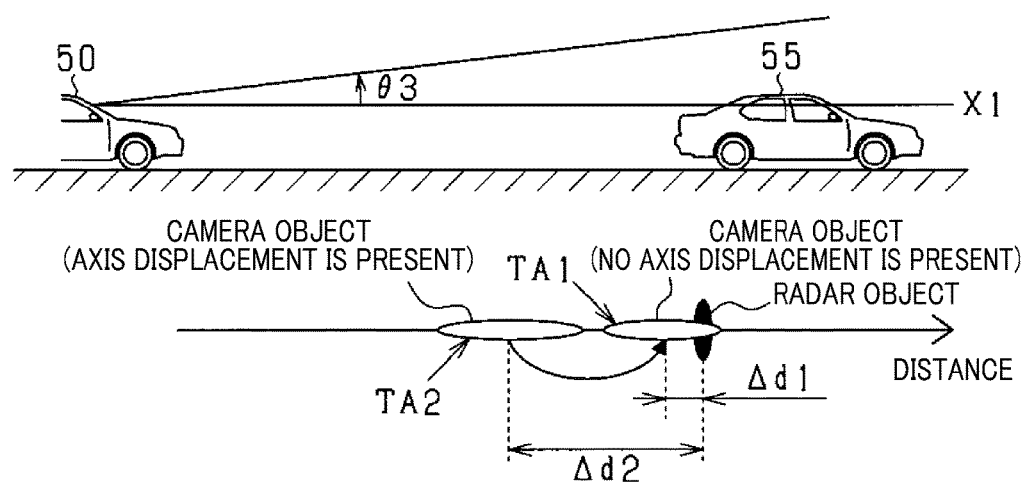
FIG. 3 is an explanatory diagram showing a detected distance shift when an imaging axis is displaced.

The reset determination process is performed because of the following reason. In the case where an axis displacement has occurred in the imaging axis X1, depending on the angle of the axis displacement, the distance up to the object recognized by the image recognition is erroneously read. FIG. 3 schematically shows a distance displacement of the camera object caused by the axis displacement of the imaging axis X1. It is assumed that light axis displacement has not occurred in FIG. 3.

When comparing detection result between the imaging device 11 and the radar apparatus 12 for the detected distances up to the same object (preceding vehicle 55 in FIG. 3) from the own vehicle 50, in the case where an axis displacement has not occurred in the imaging axis X1, the difference Δd1 between the detected distances becomes relatively small. In contrast, in the case where the imaging axis X1 is displaced with a predetermined angle θ3 upwardly from a horizontal position with respect to, for example, the travelling road surface, the difference Δd2 between the detected distances becomes relatively large. In this case, nevertheless the imaging device 11 and the radar apparatus 12 detect the same object, the imaging process possibly recognizes the two objects (camera object and radar object) as different objects. In this case, the reliability of the axis displacement determining counter CJ is lowered so that erroneous determination may be caused in the determination process of a radar axis displacement. The displacement of the detected distance due to such an imaging axis displacement is improved by the vanishing point learning (TA2→TA1).

When starting vehicle operation, a learning state of the vanishing point changes from a state of incomplete-learning for both the optical flow and the white line recognition to a state of complete-learning for the optical flow. Then the state changes to a state of complete-learning. Also, depending on these changes of the learning state, a reliability of the learning state of the vanishing points, that is an amount of displacement with respect to the true value of the vanishing points, may be changed after starting the determination process of a radar axis displacement. For example, the reliability differs between a state where the vanishing point learning by the white line recognition is incomplete, and a state where the vanishing point learning is completed. In the former case the amount of displacement with respect to the true value is larger than that of the latter case. Hence, the reliability of the learning result tends to decrease.

According to the present embodiment, the camera object detecting counter CA and the axis displacement determining counter CJ are disabled depending on the learning result of the vanishing point learning. Specifically, after activating the determination process of a radar axis displacement, when the reliability of the learning result of the vanishing points is not changed, a count-up operation of the camera object detecting counter CA and the axis displacement determining counter CJ is maintained. On the other hand, after starting the determination process of a radar axis displacement, when the reliability of the learning result of the vanishing point changes, the camera object detecting counter CA and the axis displacement determining counter CJ are reset, and the camera object detecting counter CA and the axis displacement determining counter CJ is resumed.

Figure 4:
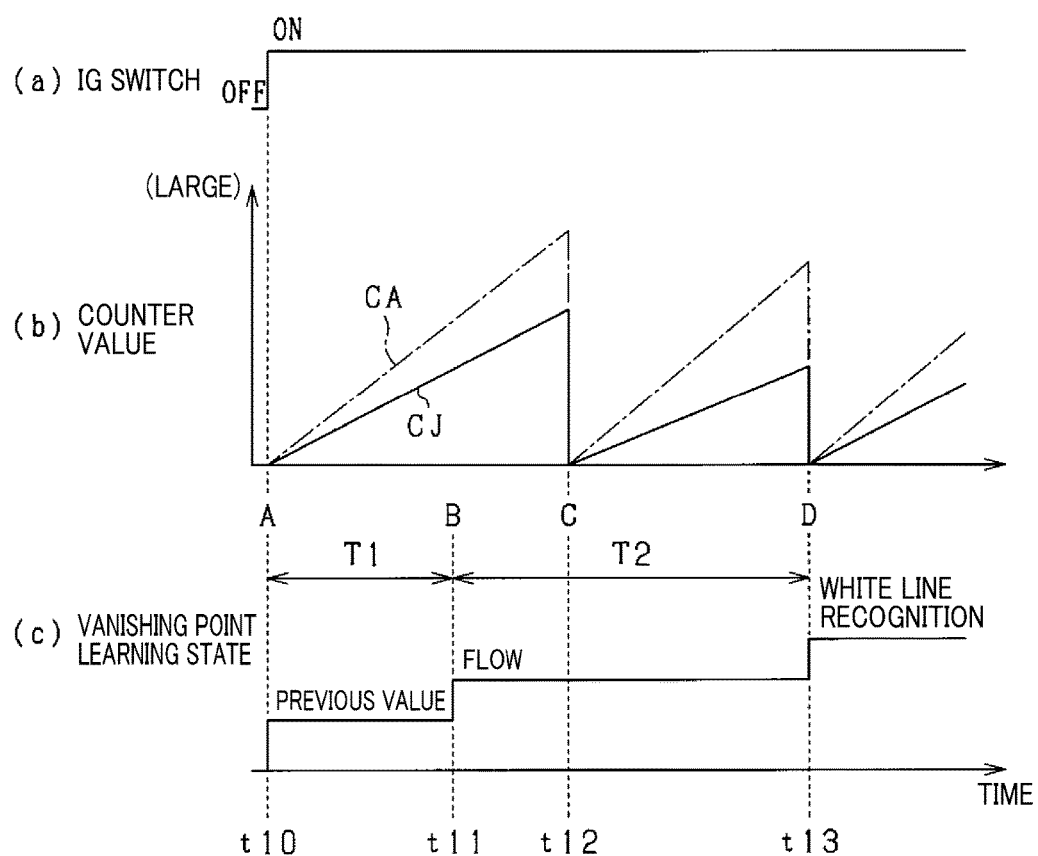
FIG. 4 is a timing diagram showing a specific determination process of a displacement of the radar axis.

Hereinafter, with reference to a timing diagram shown in FIG. 4, specific aspects of the reset determination process based on the learning result of the vanishing point will be described for the counters CA and CJ. In FIG. 4, (a) illustrates a trend of ON/OFF state of the ignition switch (IG switch), (b) illustrates a trend of the counter values of the camera object detecting counter CA and the axis displacement determining counter CJ, and (c) illustrates a trend of the learning state of the vanishing point. In FIG. 4, a case is assumed where a preceding vehicle exists at a time when the IG switch is turned ON.

At a time t10, when the IG switch is turned ON, the camera object detecting counter CA starts the count-up operation. When a radar object which can be the same object as the camera object is detected, the axis displacement determining counter CJ is incremented for an amount corresponding to the number of the detections (detection frequency). In FIG. 4, since the light axis displacement has occurred in the radar apparatus 12, the counter value is CJ<CA.

Immediately after the IG switch is turned ON, the vanishing point learning of the optical flow and the white line recognition are not yet completed so that learning value storing unit 25 maintains the learning value stored when the previous travelling of the vehicle is ended. Therefore, during the period from t10 to t11 before the vanishing point learning starts based on the optical flow, an imaging process is performed using previous learning value FOE_A.

At a time t11 where a predetermined period T1 elapses after the IG switch is turned ON, a command is outputted in order to start the vanishing point learning based on the optical flow. It should be noted that the predetermined period T1 (e.g., several tens of seconds) is set to satisfy a required time for acquiring image data necessary for calculating the optical flow.

In the case where the vanishing point calculated in accordance with the optical flow is significantly changed with respect to the previous learning value FOE_A, it is estimated that the reliability of the learning result of the vanishing point is changed after starting the count-up operation of the camera object detecting counter CA. In this case, according to the present embodiment, the camera object detecting counter CA and the axis displacement determining counter CJ are reset to zero, and the count-up operation is re-started from the beginning in order to determine the radar axis displacement. Especially in the present embodiment, at a time t12 where the vanishing point (FOE_C) in accordance with the optical flow becomes stable, the process calculates an absolute value ΔFOE(C-A) of a displacement amount between the previous learning value FOE_A and the vanishing point FOE_C in accordance with the optical flow, and determines, based on the calculated ΔFOE(C-A), that the reliability of the learning result of the vanishing point is changed.

Similar process is performed, when a vanishing point learning of the white line recognition is completed at a time t13 where a predetermined time T2 (e.g., few minutes) elapses from a time when the start command is issued to start the vanishing point learning of the optical flow. Specifically, when determining that the reliability of a learning result of the vanishing point is changed, in accordance with an absolute value ΔFOE(D-C) of a displacement amount between the vanishing point FOE_C of the optical flow and the vanishing point (FOE_D) of the white line recognition, the camera object detecting counter CA and the axis displacement determining counter CJ are reset to zero, and the count-up operation is re-started from the beginning in order to determine the radar axis displacement.

Figure 5:
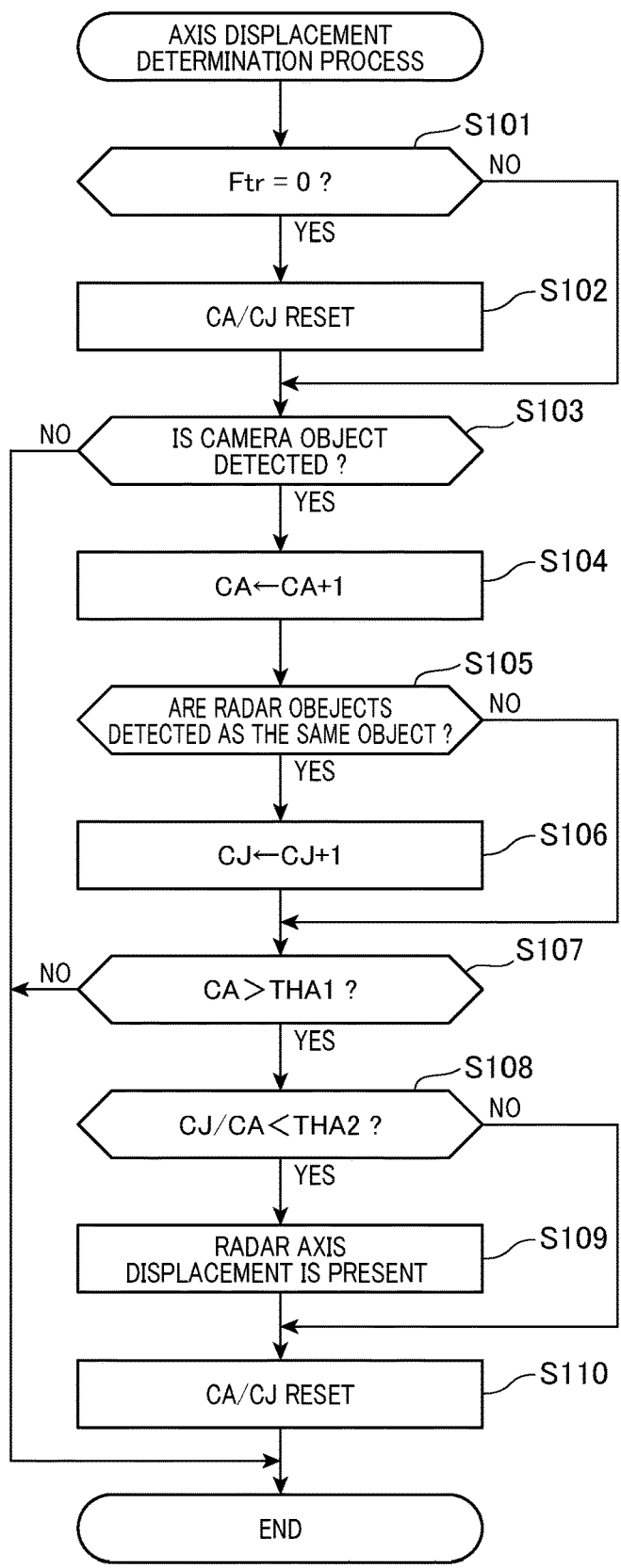
FIG. 5 is a flowchart showing a determination process of a displacement of the radar axis.
Figure 6:
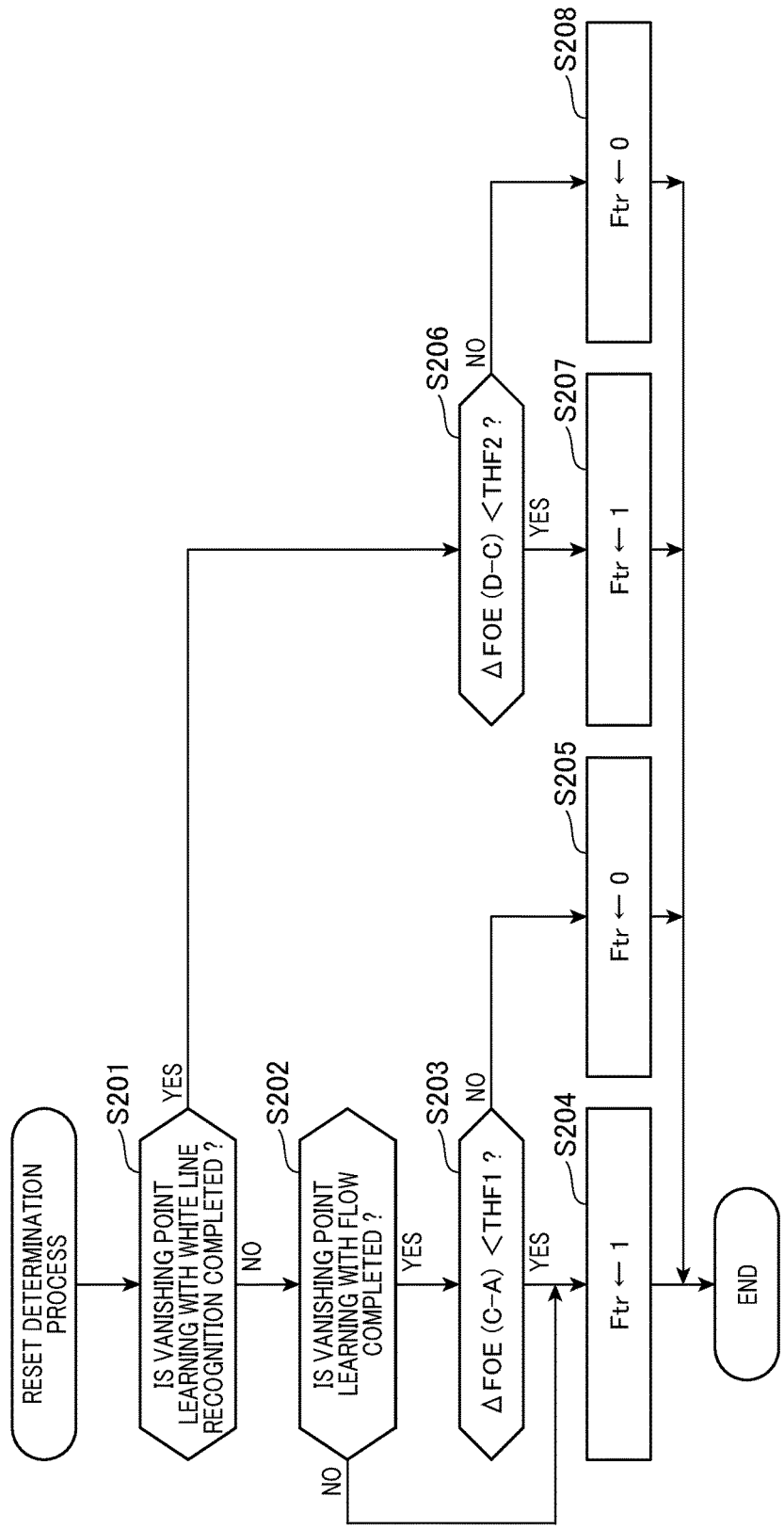
FIG. 6 is a flowchart showing a reset determination process.

Next, with reference to the flowcharts shown in FIGS. 5 and 6, a procedure executed by the radar axis displacement detecting unit according to the present embodiment will be described. These procedures are repeatedly executed at a predetermined period by the CPU in the object recognition apparatus 10.

First, a determination process of a radar axis displacement shown in FIG. 5 will be described. In FIG. 5, at step S101, the process determines whether or not the past FOE credit flag Ftr is set to zero. When the Ftr=0, the process proceeds to step S102 and resets the camera object detecting counter CA and the axis displacement determining counter CJ to zero. On the other hand, if the Ftr=1, the process proceeds to step S103 without executing the process of step S102.

At step S103, an image captured by the imaging device 11 is accepted and the process determines whether or not an object (camera object) is included in the accepted image. When the camera object is not detected, the process terminates the procedure, and when the camera object is detected, the process proceeds to step S104 and increments the camera object detecting counter CA.

In the subsequent step S105, the process determines whether or not the radar apparatus 12 has detected the same object as the camera object. When the radar apparatus has detected the object, the process proceeds to step S106 and increments the axis displacement determining counter CJ. On the other hand, when no objects have been detected, the process proceeds to step S107 without executing step S106.

At step S107, the process determines whether or not the camera object detecting counter CA is larger than a determination value THA1 (e.g., several thousands of times). When the process determines a condition CA>THA1, then proceeds to step S108, and determines whether or not the ratio of the axis displacement determining counter CJ to the camera object detecting counter CA is smaller than a determination value THA 2. When the ratio CJ/CA is larger than or equal to the determination value THA2, processing proceeds to step S110 and resets the camera object detecting counter CA and the axis displacement determining counter CJ to zero. On the other hand, when the ratio CJ/CA is smaller than the determination value THA2, then processing proceeds to step S109, determines that a light axis displacement of the radar apparatus 12 has occurred, and stores the determination result. Thereafter, the process proceeds to step S110, resets the camera object detecting counter CA and the axis displacement determining counter CJ, and terminates the procedure.

Next, a reset determination process shown in FIG. 6 will be described. In FIG. 6, at step S201, the process determines whether or not the vanishing point learning of the white line recognition is completed. When the vanishing point learning of the white line recognition is not completed, the process proceeds to step S202, and determines whether or not the vanishing point learning of the optical flow is completed. At this point, the process determines whether or not the vanishing point calculated by the optical flow shows a stable value, and calculates the vanishing point learning value (FOE_C) based on the optical flow, when the process determines a stable value exits. The determination whether or not the vanishing point calculated by the optical flow has a stable value is made based on dispersion in the vertical surface of the vanishing points, such that a positive determination is made when the dispersion is smaller than a predetermined value. When the vanishing point calculated from the optical flow is determined as stable, and the vanishing point learning value (FOE_C) is calculated based on the optical flow, the process is proceeds to step S203. In step S203, the process determines whether or not an absolute value ΔFOE(C-A) of a displacement amount between the initial value or the previous learning value (FOE_A) and the vanishing point learning value FOE_C in accordance with the optical flow, is smaller than a determination value THF1 (reliability determination means). When a condition of ΔFOE(C-A)<THF1 is met, the process proceeds to step S204 and sets the past FOE credit flag Ftr to be 1. When the process determines that the condition ΔFOE(C-A)<THF1 is not met, proceeds to step S205 and sets the past FOE credit flag Ftr to be 0.

When the vanishing point learning of the optical flow is incomplete and before the vanishing point becomes stable, the process determines as negative at step S202 and proceeds to step S204. In this case, since the past FOE credit flag Ftr is set to 1, a counter reset is not performed.

When the vanishing point learning of the white line recognition is completed, a determination is affirmative at step S201 and the process proceeds to step S206. At step S206, the process determines whether or not an absolute value ΔFOE(D-C) of a displacement amount between the vanishing point FOE_C of the optical flow and the vanishing point FOE_D of the white line recognition is smaller than a determination value THF2 (reliability determination means). Then, when a condition ΔFOE(D-C)<THF2 is met, the process proceeds to step S207 and sets the past FOE credit flag Ftr to be 1. On the other hand, when the process determines that a condition ΔFOE(D-C)<THF2 is negative, the process proceeds to step S208 and sets the past FOE credit flag Ftr to be 0.

Figure 7:
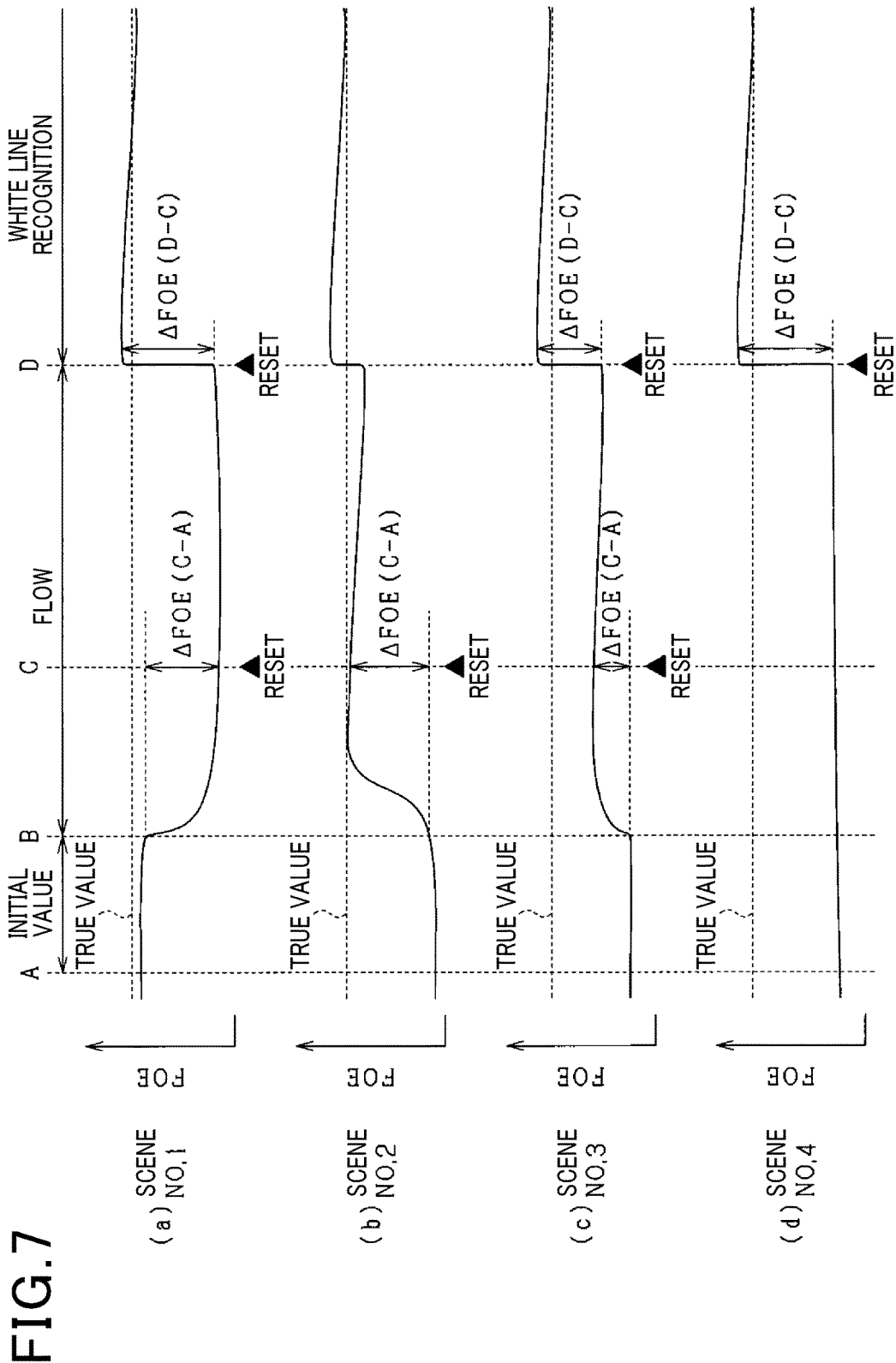
FIG. 7 is a timing diagram showing a counter reset timing depending on a learning state of vanishing points.

FIG. 7 is a timing diagram showing a reset timing depending on a learning state of the vanishing point. In FIG. 7, (a) represents a case where the initial value (or previous learning value) is correct with respect to the true value and the vanishing point based on the optical flow is displaced from the true value, and (b) represents a case where an initial value (or previous learning value) is displaced from the true value and the vanishing point based on the optical flow is correct with respect to the optical flow, and (c) and (d) represent a case where both of the initial value (or previous learning value), and the vanishing point based on the optical flow are displaced. It should be noted that in case (c) it is assumed that the amount of displacement with respect to the true value of the vanishing point of the optical flow is smaller than that of the case (d). In FIG. 7, A is the ON timing of the IG switch, B is a start timing of the vanishing point learning of the optical flow, C is a timing where the vanishing point based on the optical flow is stable, and D is a completion timing of the vanishing point learning based on the white line recognition, which correspond to A to D shown in FIG. 4.

The camera object detecting counter CA and the axis displacement determining counter CJ are reset at the timing C where the vanishing point of the optical flow becomes stable, or at the timing D where the vanishing point learning of the white line recognition is completed. For example, in the scenes (a) and (c), an absolute value ΔFOE(C-A) and an absolute value ΔFOE(D-C) are large, where ΔFOE(C-A) is defined as a displacement amount between the previous learning value FOE_A and the vanishing point FOE_C in accordance with the optical flow is large, and ΔFOE(D-C) is defined as a displacement amount between the vanishing point FOE_C of the optical flow and the vanishing point (FOE_D) of the white line recognition. In this case, the counters CA and CJ are reset at the timing C and the timing D. In the scene (b), the counters CA and CJ are reset only at the timing C, and in the scene (d), the counters CA and CJ are reset only at the timing D.

According to the above-described embodiments, the following beneficial effects can be obtained.

The configuration of the embodiments disables, based on a result of the vanishing point learning which learns an amount of axis displacement of the imaging axis X1 of the imaging device 11, the information about the displacement of the light axis X2 of the radar apparatus 12 which have been acquired up to the current time. In the case where the radar apparatus 12 is determined whether or not the light axis displacement has occurred, by using an object detection result of the imaging device 11, the determination accuracy of the light axis displacement in the radar apparatus 12 is changed depending on the learning result of the amount of axis displacement of the imaging device 11. In this respect, according to the above-described configurations, erroneous determination can be suppressed in the process of determining whether or not a light axis displacement has occurred.

Specifically, the configuration of the embodiments disables the counters CA and CJ which are information about the light axis displacement, when detecting a change in the reliability of learning result of the vanishing point with respect to the true value, after activating the determination process of a radar axis displacement. After activating the determination process of a radar axis displacement, when the reliability is changed in the learning result of the vanishing point learning, and when the image processing is performed based on the vanishing point having a large displacement value with respect to the true value, the accuracy of the determination process of a radar axis displacement is lowered. Accordingly, erroneous determination may be caused. In this respect, the configuration is employed to disable the information about the radar axis displacement which is acquired when the result of the vanishing point learning is unreliable. Thus, erroneous determination of the determination process of a radar axis displacement can be avoided as much as possible.

The vanishing point learning of the white line recognition requires a certain amount of time (e.g., several minutes to several tens of minutes) to complete the learning, while the reliability of the vanishing point learning is high. Hence, in the period until the vanishing point learning of the white line recognition is completed, it is necessary to perform image processing, using a learning value used in the previous vehicle-drive, or a learning value acquired by a learning process having lower reliability than that of a white line recognition, for example, a learning value of the vanishing point learning based on the optical flow. On the other hand, according to the determination process of a radar axis displacement of the present embodiment, image data captured by the imaging device 11 is used. Therefore, when the learned vanishing point is displaced with respect to the true value, erroneous determination may be caused. In this respect, a configuration is employed, in which information about the light axis is disabled based on the learning result of the vanishing point, that is, the reliability of the vanishing point learning result, at a time when the vanishing point learning of the white line recognition is completed after the vehicle is started to be driven. According to this configuration, in the determination process of a radar axis displacement, the counters CA and CJ can be disabled at an appropriate timing, minimizing erroneous determination which is caused by insufficient learning accuracy of the vanishing point learning. Also, when the accuracy is sufficiently secured for the vanishing point learning, the determination process of a radar axis displacement can be performed even before the vanishing point learning of the white line recognition is completed.

In the vanishing point learning of the optical flow, it is possible to complete the learning earlier after starting the vehicle to be driven. However, the learning accuracy thereof is lower than that of the white line recognition so that a displacement with respect to the true value may be occurred. According to the present embodiment, since the counters CA and CJ are disabled in the case where the counters CA and CJ are measured with an insufficient reliability of the vanishing point learning result, erroneous determination of the radar axis displacement can be minimized even before completing the vanishing point learning of the white line recognition.

According to the present embodiment, a configuration is employed in which an axis displacement of the radar apparatus 12 is determined based on an object detection result of the imaging device 11 and the radar apparatus 12 in a vehicle provided with the imaging device 11 and a radar apparatus 12 as an object detecting means. Generally, since the detection range and detection accuracy of the object are different between the imaging device 11 and the radar apparatus 12, both the imaging device 11 and the radar apparatus 12 complement weaknesses thereof, when being mounted to perform object detection. Moreover, the imaging device 11 and the radar apparatus 12 are combined, whereby the light axis of the radar apparatus 12 can be detected using the imaging device 11 and the image data.

The present disclosure is not limited to the above-described embodiments, and may be embodied in the following manner.

In the above-described embodiments, when the reliability of the learning result of the vanishing point is changed, and the information (camera object detecting counter CA and the axis displacement determining counter CJ) about the light axis displacement is reset, contents of the camera object detecting counter CA and the axis displacement determining counter CJ are held. After resetting the counters CA and CJ, and when the reliability has sufficiently secured for the result of the vanishing point learning through a measurement period of the reset counters, a subsequent determination process of a radar axis displacement is performed by using the information acquired before the reset. According to the above-described configuration, by utilizing the counters CA and CJ which are acquired under a state where the reliability of the result of the learning result is secured, a required time to determine a displacement of the axis of the radar apparatus 12 can be shortened.

Figure 8:
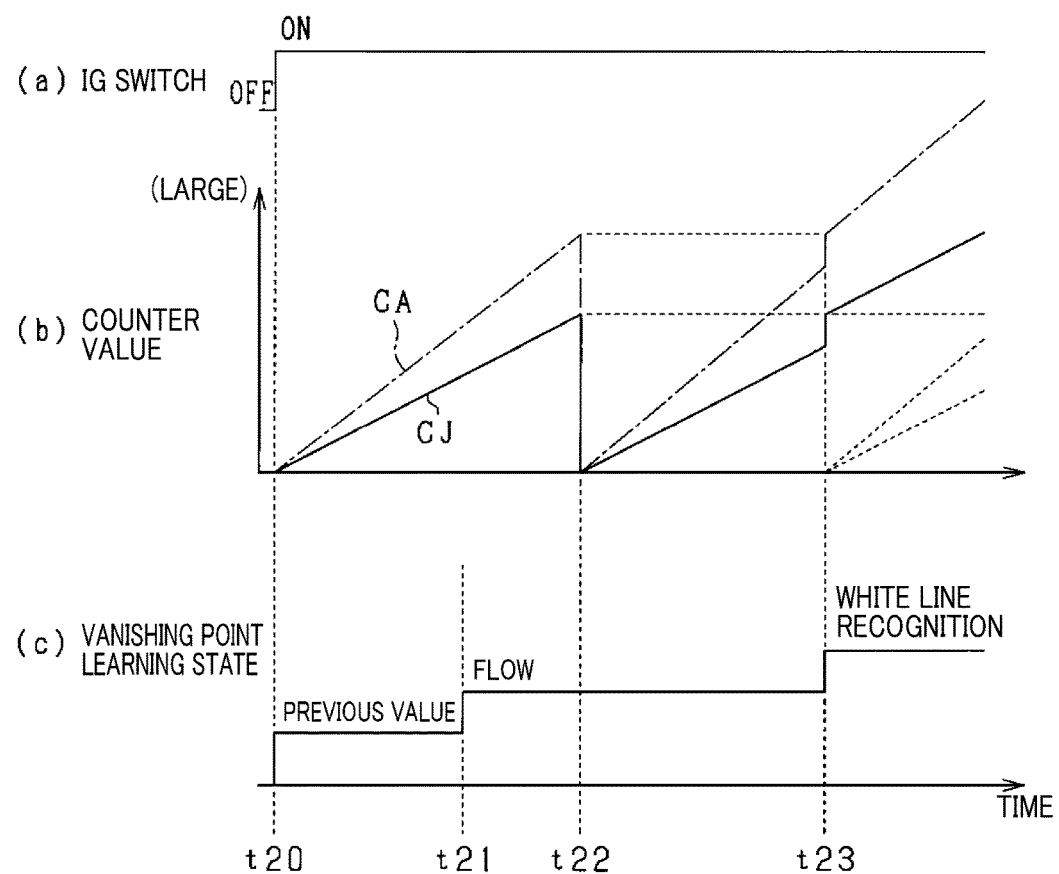
FIG. 8 is a timing diagram showing specific aspect of other embodiments.

FIG. 8 is a timing diagram showing a specific procedure of the reset determination process in the above-described configuration. In FIG. 8, part of diagrams (a) to (c) are the same as that shown in FIG. 4. In FIG. 8, a case is assumed that the absolute value ΔFOE(C-A) is large, ΔFOE(C-A) being a displacement amount between the previous learning value FOE_A and the vanishing point FOE_C in accordance with the optical flow. In this case, at the time t22, the camera object detecting counter CA and the axis displacement determining counter CJ are memorized (information holding means). Subsequently, the camera object detecting counter CA and the axis displacement determining counter CJ are reset (disabling means). Thereafter, at time t23, when completing the vanishing point learning of the white line recognition, and the reliability has sufficiently secured for the result of the vanishing point learning performed before the time t22, the counters memorized at the time 22 is resumed at the time t23. Here, "the reliability has sufficiently secured for the result of the vanishing point learning performed before the time t22", for example, is detected based on the learning result of the vanishing point learning. Specifically, it is determined that the reliability of the learning result of the vanishing point learning before the time t22 is sufficiently secured, when the absolute value ΔFOE(D-C) is larger than the determination value THF2 and an absolute value ΔFOE(D-A) is smaller than a determination value THF3, where the ΔFOE(D-C) is an absolute value of a displacement amount between the vanishing point (FOE_C) of the optical flow, and the vanishing point (FOE_D) of the white line recognition, and the ΔFOE(D-A) is an absolute value of a displacement amount between a previous learning value FOE_A and the vanishing point learning value FOE_D of the white line recognition. In this case, at a time t23 at which the vanishing point learning is completed, the axis displacement determination of the radar apparatus 12 is not necessarily resumed, thereby determining early whether or not an axis displacement has occurred in the radar apparatus 12.

According to the above-described embodiment, as an example, a radar axis displacement determining process is described, in which the radar axis displacement determining process is performed during a period from when the ignition switch is turned ON to when the vanishing point learning is completed. However, for the present disclosure, a radar axis displacement determination process may be performed in a period after completing the vanishing point learning of the white line recognition. The vanishing point learning of the white line recognition has high accuracy, and once the learning is completed, a change in the learning value is relative low. However, depending on a change in a loading state and a running state of the vehicle, an axis direction of the imaging axis X1 changes so that the position of the vanishing point is likely to change. Hence, even in a radar axis displacement determination process performed after completion of the vanishing point learning of the white line recognition, information (counter) about the light axis displacement is disabled based on the learning result of the vanishing point learning, whereby erroneous determination in the radar axis displacement determining process of the radar apparatus 12 can be suppressed.

The above-described embodiments are adapted for a configuration where the vanishing point learning based on the optical flow and the vanishing point learning based on the white line recognition are performed. However, a configuration of the vanishing point learning based on either the optical flow or the white line recognition can be employed. For example, in the case where the vanishing point learning of the optical flow is not performed, referring to FIG. 4, the counter reset timing is only at a time when the vanishing point learning of the white line recognition is completed (D).

An axis displacement determining means for determining an axis displacement of the second object detecting means is not limited to the above-described configurations as long as the axis displacement is determined based on the object detection result by the first object detecting means and the second object detecting means. For example, a configuration can be employed in which an axis displacement of the radar apparatus 12 is determined by detecting, based on the vanishing point detected using an image captured when the vehicle is running and the transmission direction of the signal transmitted from the radar apparatus 12, an error between the transmission direction of the signal and a straight direction of the vehicle.

According to the above-described embodiments, as a reliability determination means, where a change in the reliability of the learning result of the vanishing point learning is detected, after the radar axis displacement determination process is started, a configuration is employed in which a change in a level of the vanishing point learning value is detected. Specifically, an absolute value ΔFOE(C-A) which is a displacement amount between the previous learning value FOE_A and the vanishing point FOE_C in accordance with the optical flow, and an absolute value ΔFOE(D-C) which is a displacement amount between the vanishing point FOE_C of the optical flow and the vanishing point (FOE_D) are compared with a determination value, thereby detecting a change in the reliability. The reliability determination means is not limited to this configuration. However, for example, the reliability may be detected based on a degree of change (differential value) in the vanishing point learning value.

According to the above-described embodiments, a configuration may be employed in which an axis displacement determination result in accordance with a ratio CJ/CA, that is, a determination result that light axis displacement exists is disabled, based on the result of vanishing point learning, after detecting a light axis displacement based on the ratio CJ/CA. In this case, the determination result of the axis displacement based on the ratio CJ/CA corresponds to "information about an axis displacement of the second object detecting means"

According to the above-described embodiments, a case is described in which the first object detecting means corresponds to the imaging device 1 and the second object detecting means corresponds to the radar apparatus 12. However, the combination of the first object detecting means and the second object detecting means are not limited to the above-described combination. For example, the present disclosure may be adapted to a system provided with a plurality of radar apparatuses (first radar apparatus, second radar apparatus) as the first object detecting means and the second object detecting means. Specifically, in a configuration that determines whether or not an axis displacement of a light axis in the second radar apparatus based on the object detection result of the first and second radar apparatuses, information about axis displacement of the second radar apparatus is disabled based on a learning result of an amount of axis displacement of the light axis in the first radar apparatus.

In FIG. 3 of the above-described embodiments, a case is described as an example, where an axis displacement occurs in a vertical surface of the imaging device 11. It is not limited to an axis displacement in the vertical surface. The present disclosure can be adapted to a case where an axis displacement occurs in the horizontal surface.

The detection available area of the first object detecting means and the second object detecting means is not limited to ahead of the vehicle. However, the detection available area may be a backward or a side of the vehicle. Also, mounting positions of the first and second object detecting means are not specifically limited.

According to the above-described embodiments, an imaging device and a radar apparatus are used as the object detecting means.

However, the object detecting means is not limited to these apparatus. For example, a sonar may be used to detect objects using ultrasonic waves as the transmission waves.

According to the above-described embodiments, an object recognition apparatus mounted on a vehicle is exemplified. However, an object recognition apparatus can be mounted on moving bodies such as railway vehicles, ships, or aircraft.

REFERENCE SIGNS LIST

10: object recognition apparatus
11: imaging device (first object detecting means)
12: radar apparatus (second object detecting means)
13: white line recognition unit
14: flow calculation unit
20: vanishing point calculation unit
22: vanishing point learning unit
23: first learning unit
24: second learning unit
25: learning value storing unit
30: radar axis displacement detecting unit
31: camera object detecting unit
32: radar object detecting unit
33: axis displacement information calculation unit
34: axis displacement determining unit
35: reset determining unit
50: own vehicle
X1: imaging axis (reference axis)
X2: light axis (reference axis)

The invention claimed is:
1. An object recognition apparatus characterized in that the apparatus is applied to a moving body provided with a first object detecting means and a second object detecting means as an object detecting means that detects an object existing in predetermined detection available areas, the detection available areas each including a reference axis, the apparatus comprising:
axis displacement learning means for learning an axis displacement of a reference axis of the first object detecting means;
axis displacement determining means for performing, based on an object detecting counter and an axis displacement determining counter, an axis displacement determination process for determining whether or not an axis displacement has occurred in a reference axis of the second object detecting means, the object detecting counter being incremented in response to the first object detecting means detecting a target object corresponding to the object, and the axis displacement determining counter being incremented in response to the second object detecting means detecting the same object as the target object detected by the first object detecting means; and
disabling means for resetting, based on a learning result of the axis displacement by the axis displacement learning means, the object detecting counter and the axis displacement determining counter.

2. The object recognition apparatus according to claim 1, wherein the apparatus includes reliability determining means for determining, based on a learning result of the axis displacement by the axis displacement learning means, whether or not a change in a reliability of the learning result has occurred with respect to a true value, after activating the axis displacement determination process; and the disabling means is configured to reset the object detecting counter and the axis displacement determining counter, in response to the reliability determining means determining that a change in the reliability of the learning result has occurred.

3. The object recognition apparatus according to claim 2, wherein the apparatus includes information holding means for holding values of the object detecting counter and the axis displacement determining counter, the values of the object detecting counter and the axis displacement determining counter having being acquired at a time before being reset; and the apparatus performs the axis displacement determination process, in the case where the disabling means resets the object detecting counter and the axis displacement determining counter, thereafter, the reliability of the learning result being sufficiently secured is detected with respect to the true value at a time when the object detecting counter and the axis displacement determining counter are reset is acquired, by using the values of the object detecting counter and the axis displacement determining counter held in the information holding means.

4. The object recognition apparatus according to claim 1, wherein the first object detecting means is configured as an imaging device that captures an image of a peripheral environment including a road;

the apparatus includes marking recognition means for recognizing a marking of the road, based on the image captured by the first object detecting means;

the axis displacement learning means includes means for learning an axis displacement of the reference axis of the first object detecting means, based on marking information which is information about a marking recognized by the marking recognition means; and the disabling means is configured to reset, based on the learning result, the object detecting counter and the axis displacement determining counter, in response to learning that the axis displacement is completed based on the marking information of the axis displacement learning means, after starting the operation of the moving body.

5. The object recognition apparatus according to claim 4, wherein the apparatus includes a flow calculating means for calculating an optical flow, based on an image captured by the first object detecting means;

the axis displacement learning means includes first learning means and second learning means, the first learning means learning an axis displacement of the reference axis of the first object detecting means, based on the marking information, and the second learning means learning an axis displacement of the reference axis of the first object detecting means, based on the optical flow calculated by the flow calculating means; and the disabling means is configured to reset, based on the learning result, the object detecting counter and the axis displacement determining counter in response to learning that the axis displacement is completed based on the marking information of the axis displacement learning means, after starting the operation of the moving body, and before completing the learning of the axis displacement based on the marking information.

6. The object recognition apparatus according to claim 1, wherein the first object detecting means is configured as an imaging device that captures an image of a peripheral environment including a road; and the second object detecting means is configured as a detection apparatus that detects the object by transmitting transmission waves and receiving the transmission waves.

7. An object recognition method applied to a moving body provided with a first object detector and a second object detector, which detect objects existing in predetermined detection available areas, the detection available areas each including a reference axis, the method comprising:

learning an axis displacement of a reference axis of the first object detector;

performing, based on an object detecting counter and an axis displacement determining counter, an axis displacement determination process for determining whether an axis displacement has occurred in a reference axis of the second object detector, the object detecting counter being incremented in response to the first object detector detecting a target object corresponding to the object, and the axis displacement determining counter being incremented in response to the second object detector detecting the same object as the target object detected by the first object detector; and resetting, based on a learning result of the axis displacement, the object detecting counter and the axis displacement determining counter.

8. An object recognition system applied to a moving body provided with a first object detector and a second object detector, which detect objects existing in predetermined detection available areas, the detection available areas each including a reference axis, the system comprising:

a central processor;

a non-transitory computer-readable storage medium; and a set of computer-executable instructions stored on the non-transitory computer-readable storage medium that cause the central processor to implement:

learning an axis displacement of a reference axis of the first object detector;

performing, based on an object detecting counter and an axis displacement determining counter, an axis displacement determination process for determining whether an axis displacement has occurred in a reference axis of the second object detector, the object detecting counter being incremented in response to the first object detector detecting a target object corresponding to the object, and the axis displacement determining counter being incremented in response to the second object detector detecting the same object as the target object detected by the first object detector; and resetting, based on a learning result of the axis displacement, the object detecting counter and the axis displacement determining counter.

* * * * *